(12) United States Patent
Birch et al.

(10) Patent No.: US 11,091,000 B2
(45) Date of Patent: *Aug. 17, 2021

(54) ACTUATOR SYSTEM

(71) Applicant: JAGUAR LAND ROVER LIMITED, Coventry (GB)

(72) Inventors: Luke Birch, Shipston on Stour (GB); Robert Neilson, Coventry (GB); James Robertson, Coventry (GB); Sam Brown, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 87 days.

This patent is subject to a terminal disclaimer.

(21) Appl. No.: 16/133,860

(22) Filed: Sep. 18, 2018

(65) Prior Publication Data

US 2019/0084368 A1   Mar. 21, 2019

(30) Foreign Application Priority Data

Sep. 19, 2017 (GB) ..................................... 1715067

(51) Int. Cl.
*B60G 17/08* (2006.01)
*B60G 13/14* (2006.01)
(Continued)

(52) U.S. Cl.
CPC ............. *B60G 17/08* (2013.01); *B60G 13/14* (2013.01); *B60G 15/06* (2013.01); *B60G 17/015* (2013.01);
(Continued)

(58) Field of Classification Search
CPC .......... B60G 21/06; B60G 13/14; B60G 15/06
See application file for complete search history.

(56) References Cited

U.S. PATENT DOCUMENTS

| 4,911,468 | A | | 3/1990 | Fukunaga |
| 5,044,660 | A | * | 9/1991 | Yamamura ............. B60G 21/06 280/5.52 |

(Continued)

FOREIGN PATENT DOCUMENTS

| GB | 2518901 A | 4/2015 |
| JP | H04143113 A | 5/1992 |

OTHER PUBLICATIONS

Combined Search and Examination Report corresponding to application No. GB 1715067.3, dated Mar. 8, 2018, 2 pages.

*Primary Examiner* — Nicole T Verley
(74) *Attorney, Agent, or Firm* — Reising Ethington P.C.

(57) ABSTRACT

An actuator system for a vehicle suspension system includes: an actuator having a piston and a first fluid chamber separated from a second fluid chamber by the piston; a hydraulic pump having a first port connected by a first hydraulic circuit to the first chamber via a first valve, the first valve being a damper valve operable to variably restrict flow of hydraulic fluid out of the first chamber; a first hydraulic accumulator connected to the first hydraulic circuit between the first port and the first valve; and a second hydraulic accumulator connected to the first port by a second valve, the second valve being a variable pressure relief valve operable to variably restrict flow of hydraulic fluid from the first port to the second hydraulic accumulator.

9 Claims, 2 Drawing Sheets

(51) Int. Cl.
  *B60G 17/015*   (2006.01)
  *B60G 17/0195*  (2006.01)
  *B60G 17/0165*  (2006.01)
  *B60G 15/06*    (2006.01)

(52) U.S. Cl.
  CPC ..... *B60G 17/0165* (2013.01); *B60G 17/0195* (2013.01); *B60G 2202/24* (2013.01); *B60G 2204/62* (2013.01); *B60G 2300/60* (2013.01); *B60G 2400/82* (2013.01); *B60G 2400/821* (2013.01); *B60G 2500/10* (2013.01); *B60G 2500/11* (2013.01); *B60G 2500/114* (2013.01)

(56) References Cited

U.S. PATENT DOCUMENTS

| | | | | |
|---|---|---|---|---|
| 5,279,382 A * | 1/1994 | Iwata | ............... | B60T 8/175 180/197 |
| 5,342,023 A * | 8/1994 | Kuriki | ............... | B60G 17/0185 267/64.16 |
| 5,366,236 A * | 11/1994 | Kuriki | ............... | B60G 17/0185 280/124.157 |
| 5,556,115 A * | 9/1996 | Heyring | ............... | B60G 17/033 280/6.158 |
| 6,398,318 B1 * | 6/2002 | Braun | ............... | B60T 8/4881 303/122.03 |
| 6,752,403 B2 * | 6/2004 | Allen | ............... | B60G 17/005 180/89.12 |
| 7,136,736 B2 * | 11/2006 | Kuragaki | ............... | B60T 8/172 701/70 |
| 7,735,838 B2 * | 6/2010 | Rades | ............... | B60G 17/0162 280/5.507 |
| 7,751,959 B2 * | 7/2010 | Boon | ............... | B60G 17/0152 701/38 |
| 8,672,337 B2 * | 3/2014 | van der Knaap | ............... | B60G 17/0152 280/124.106 |
| 8,820,064 B2 * | 9/2014 | Six | ............... | B60G 17/056 60/414 |
| 9,352,759 B2 * | 5/2016 | Ogawa | ............... | F15B 11/028 |
| 9,481,221 B2 * | 11/2016 | Reybrouck | ............... | F16F 9/46 |
| 9,657,749 B2 * | 5/2017 | Bissbort | ............... | F04B 53/10 |
| 10,221,055 B2 * | 3/2019 | Hao | ............... | B66F 9/065 |
| 10,358,010 B2 * | 7/2019 | Boon | ............... | B60G 17/033 |
| 10,421,330 B2 * | 9/2019 | Jeong | ............... | B60G 17/019 |
| 10,434,835 B2 * | 10/2019 | Six | ............... | F15B 13/027 |
| 2016/0102686 A1 * | 4/2016 | An | ............... | F15B 13/042 60/430 |
| 2016/0238041 A1 * | 8/2016 | Kajita | ............... | E02F 9/2296 |
| 2018/0264908 A1 * | 9/2018 | Masamura | ............... | B60G 13/08 |
| 2019/0084366 A1 * | 3/2019 | Birch | ............... | B60G 17/015 |
| 2019/0084367 A1 * | 3/2019 | Birch | ............... | B60G 15/06 |

* cited by examiner

ACTUATOR SYSTEM

TECHNICAL FIELD

The present disclosure relates to an actuator system. Particularly, but not exclusively, the disclosure relates to an actuator system for a vehicle suspension. Aspects of the invention relate to an actuator system, to a vehicle, and to a method of operating a vehicle.

BACKGROUND

Suspension systems on vehicles are known to improve the ride of the vehicle compared to a vehicle without any suspension.

Thus, the wheels, or other ground engaging structures such as tracks, of a vehicle with suspension, are able to move relative to the body of the vehicle. As such, the body has various degrees of freedom (DOF) of movement. The significant DOF are "heave" i.e. movement in a vertical direction, pitch and roll.

Motion of the vehicle body in heave, pitch and roll at frequencies close to the first damped natural frequency of each respective degree of freedom are known as primary body motions. They are typically defined as frequencies from 1 to 3 Hz. Primary body motions may be road induced, but in the case of roll and pitch, primary body motions may also be driver induced.

The motion of the vehicle body in heave, pitch and roll at frequencies above the first damped natural frequency of each respective degree of freedom are known as secondary body motions. They are typically defined as frequencies above 3-4 Hz. Secondary body motions are almost exclusively road induced.

Passive suspension systems are also known wherein the system reacts to wheel to body motion.

Active suspension systems are known wherein the characteristics of the suspension system are modified depending upon the immediate suspension requirements. Active suspension systems operate both dependently and independently of wheel to body motion and generate forces on request. An active suspension system needs to deal with both low frequency active force demands as well as disturbance inputs which may tend to have a higher frequency content. Active force demands are force requests calculated to provide a desired vehicle behavior and in pursuit of which the various elements of the actuation system are controlled. Satisfying these force demands may necessitate the addition of energy into the suspension system, or the extraction of energy from the suspension system (e.g. damping). These active force demands are typically, though not exclusively, limited to primary body motion frequencies. Disturbance inputs are displacement/velocity disturbance inputs to the actuation system resulting from either the road surface profile or motion of the body.

It is an aim of the present invention to address disadvantages associated with the prior art.

SUMMARY

Aspects and embodiments of the invention provide an actuator system, a vehicle, and a method of operating a vehicle as claimed in the appended claims.

According to an aspect of the invention, there is provided an actuator system for a vehicle suspension system comprising:

an actuator having a piston and a first fluid chamber separated from a second fluid chamber by the piston;

a hydraulic pump having a first port connected by a first hydraulic circuit to the first chamber via a first valve, the first valve being a damper valve operable to variably restrict flow of hydraulic fluid out of the first chamber;

a first hydraulic accumulator connected to the first hydraulic circuit between the first port and the first valve; and a second hydraulic accumulator connected to the first port by a second valve, the second valve being a variable pressure relief valve operable to variably restrict flow of hydraulic fluid from the first port to the second hydraulic accumulator.

This provides the advantage that the separate accumulators provide compliances for the separate high and low frequency force demands. The first accumulator is always connected and in use, accommodating the relatively low power high frequency force demands, whereas the second accumulators are only required for low frequency demands, which results in larger flows and hence require more power. This decoupling allows the second accumulators to be used only when required therefore reducing the average power consumption of the system without adversely affecting its response time.

According to another aspect of the invention there is provided a vehicle including a ground engaging structure mounted on a suspension system attached to a vehicle body thereby defining a sprung mass and an unsprung mass, the vehicle including the actuator system as defined in the above aspect of the invention acting at least to partially support the sprung mass on the unsprung mass, wherein one or more or all of the
first valve,
first accumulator,
third valve, and
third accumulator
define at least a part of the unsprung mass,
and/or wherein one or more or all of the
second valve,
second accumulator,
fourth valve,
fourth accumulator, and
pump
define at least a part of the sprung mass.

According to yet another aspect of the invention there is provided a method of operating the vehicle of the above mentioned another aspect of the invention, the method including:

a) defining a first target pressure for the first chamber, b) operating the pump to generate the first target pressure in the first chamber and the first accumulator, c) setting the second valve relief pressure to a value dependent upon the first target pressure.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
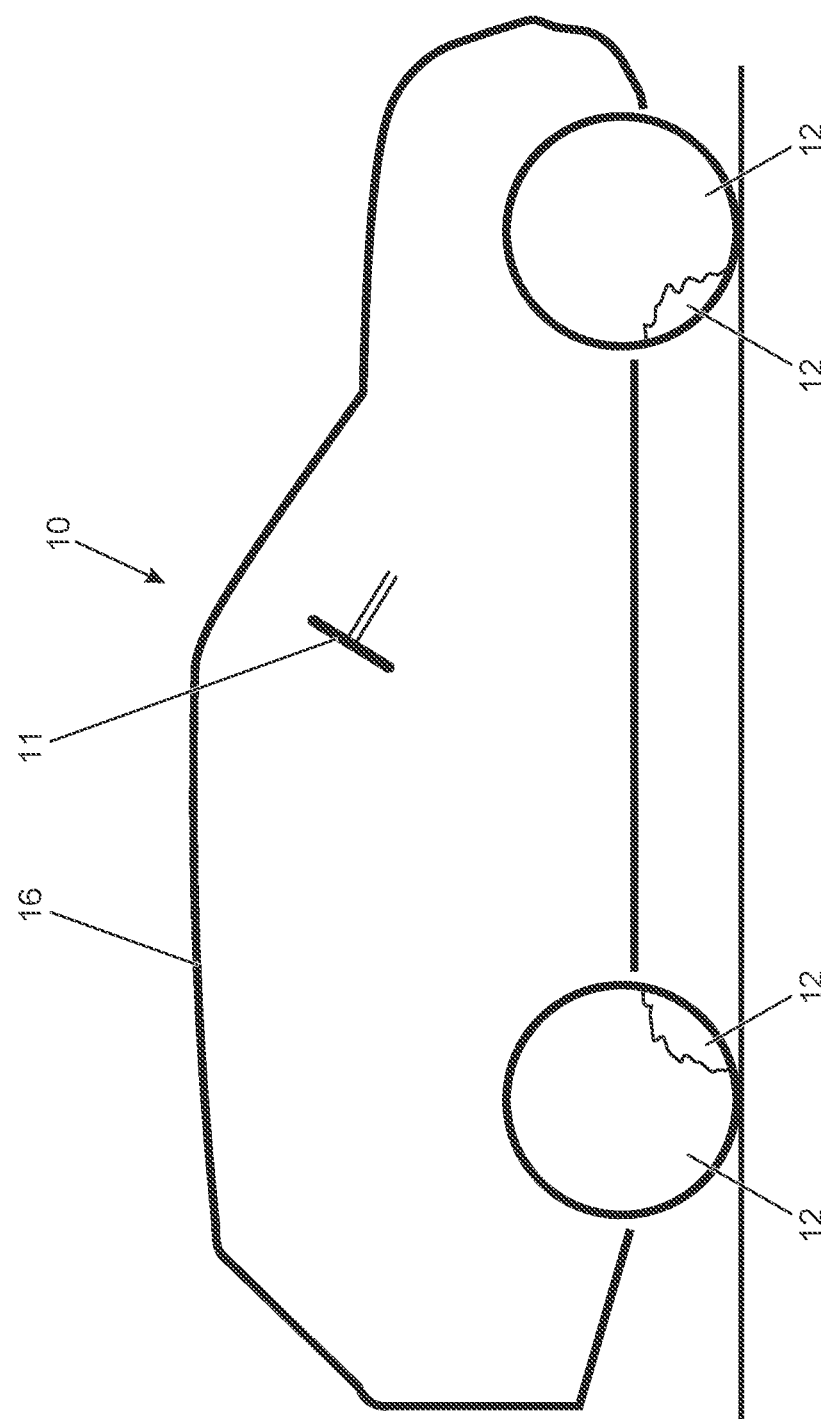
FIG. 1 is a vehicle according to an embodiment of the present invention including at least one actuator system.

With reference to the figures there is shown a vehicle 10 having ground engaging structure, in this case a form of four wheels 12. An active suspension system 14 connects each wheel 12 to a body 16 of the vehicle 10.

The vehicle therefore defines a sprung mass which includes body 16 and further components which will be described below, and an unsprung mass which includes wheels 12 and further components which will be described below.

Each suspension system 14 includes an actuator system 17 having an actuator 18 which couples the body 16 to the associated wheel 12. The suspension system also includes a spring 20 which couples the body 16 to the associated wheel 12. The spring 20 can be any type of spring, for example the helical spring or an air spring. As will be appreciated from FIG. 2, the actuator 18 and spring 20 act in parallel.

The actuator 18 includes a cylinder 22 containing a piston 24. The cylinder 22 is connected to the wheel 12 and the piston is connected to the body 16 via a rod 26. The piston defines a first fluid chamber C1 and a second fluid chamber C2. The piston fluidly isolates the first fluid chamber C1 from the second fluid chamber C2.

The actuator system 17 also includes a pump P having a first port P1 and a second port P2.

The actuator system 17 includes valves V1, V2, V3 and V4.

Valve V1 includes a damper valve VIA and a check valve V1B. Similarly valve V3 includes a damper valve V3A and a check valve V3B.

As shown damper valve VIA and V3A each comprises an array (in this case 3) of relief valves and associated restrictors. In further embodiments any suitable type of damper valve could be used including any type of variable damper valve or any type of non-variable damper valve.

Valves V2 and V4 are both variable pressure relief valves.

The actuator system 17 also includes hydraulic accumulators A1, A2, A3 and hydraulic galleries G1 and G2.

The actuator system 17 also includes hydraulic accumulator A4 and check valves X1 and X2.

Gallery G1 fluidly connects port P1 of pump P, outlet X10 of check valve X1, inlet V21 of valve V2, hydraulic accumulator A1, and port V1C of valve V1.

Similarly, gallery G2 connects port P2 of pump P with outlet X20 of check valve X2, inlet V41 of valve V4, hydraulic accumulator A3, and port V3C of valve V3.

Gallery 30 connects the first fluid chamber C1 with port V1D of valve V1. Similarly, gallery 32 connects the second fluid chamber C2 with port V3D of valve V3.

Gallery 34 connects hydraulic accumulator A2 with outlet V20 of valve V2 and inlet X1I of valve X1. Similarly, gallery 36 connects hydraulic accumulator A4 with outlet V4O of valve V4 and inlet X2I of valve X2.

Figure 2:
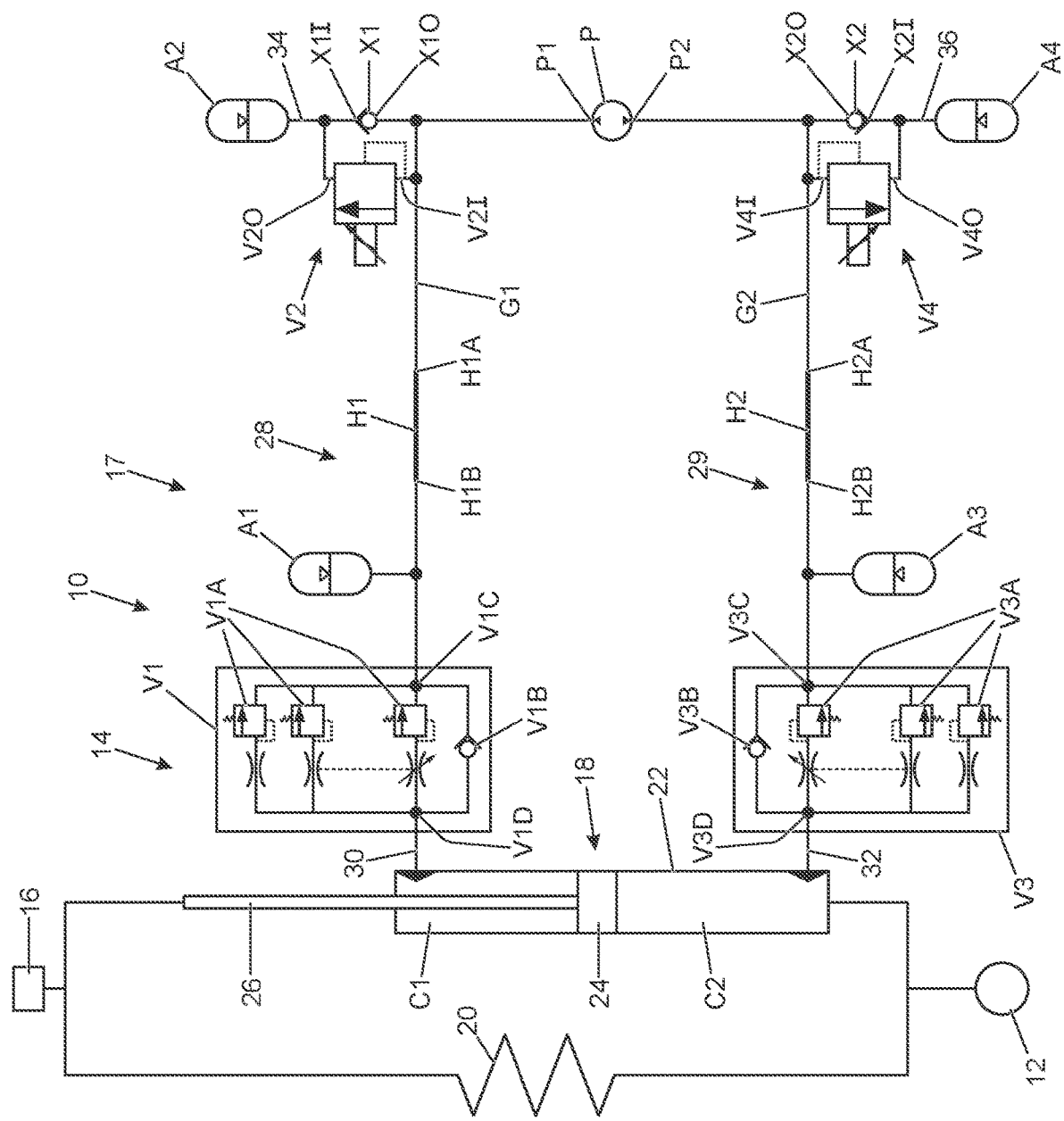
FIG. 2 is a schematic view of an actuator system according to an embodiment of the present invention used on the vehicle of FIG. 1.

As can be seen from FIG. 2, a first hydraulic circuit 28 defined at least by gallery G1 and gallery 30 connect the first port P1 of the hydraulic pump P to the first chamber C1. Similarly, a second hydraulic circuit 29 defined at least by gallery G2 and gallery 32 connect the second port P2 of the hydraulic pump P1 with the second chamber C2.

In use, the body 16 is supported on the wheel by the spring 20 and the actuator 18. The actuator 18 is used to improve the ride of the vehicle by creating a force that tends to extend the actuator, i.e. that tends to move the piston 24 upwards when viewing FIG. 2 relative to the cylinder 22, or by creating a force which tends to contract the actuator 18, i.e. that tends to move piston 24 downwardly when viewing FIG. 2 relative to the cylinder 22. As will be appreciated, an extension force in actuator 18 may cause the body 16 to rise relative to the wheel, whereas a contraction force in actuator 18 may cause the body 16 to lower relative to the wheel, dependent on the balance of forces elsewhere in the system.

By way of example, when the vehicle is negotiating a right-hand bend, the vehicle naturally tends to roll to the left and this left-hand roll can be at least partially countered by an actuator 18 associated with an outside wheel (in this example a left-hand wheel) creating an extension force and an actuator 18 associated with an inside wheel (in this example right hand wheel) creating a contraction force.

However, as the wheel is negotiating the exemplary right-hand bend, an outside wheel and/or an inside wheel may hit a bump and/or a depression in the road and the suspension system needs to be able to accommodate any such bumps or depressions.

As will be appreciated, as the driver turns the steering wheel 11 in an exemplary clockwise direction, this causes a driver induced input, in this case steering the vehicle to the right which then causes leftward roll of the vehicle body (i.e. a primary body motion) and the leftward roll can be compensated for by the actuator system 17 associated with the various wheels i.e., an active force demand is created to counter the leftward roll. Similarly, disturbance inputs such as bumps and depressions in the road cause secondary body motions which the suspension system must also accommodate.

Driver induced inputs tend to be relatively slow when compared to road induced inputs. In one example, driver induced inputs may typically occur at a frequency of less than 3 Hz whereas road induced inputs occur at a significantly higher frequency, for example between 3 and 30 Hz. The suspension system needs to accommodate the relatively low frequency driver induced inputs and the relatively high frequency road induced inputs.

Operation of the suspension system 14 is as follows:

Example 1

In this example, the wheel 12 shown in FIG. 2 is a front left wheel. The vehicle is travelling along a straight and notionally smooth road. The front left of the vehicle is being supported substantially entirely by spring 20, and as such actuator 18 is not creating any significant force, i.e. it does not create an extension force nor does it create a contraction force.

The driver then creates a driver induced input by turning the steering wheel 11 clockwise which causes the vehicle to turn to the right which in turn will tend to cause the vehicle to roll to the left. In order to prevent or minimize or control roll to the left the suspension system creates an active force demand by causing the second fluid chamber C2 to be pressurized to a target pressure which causes an extension force to be generated by the actuator 18, thereby reducing the leftward roll.

In more detail, sensors (not shown) in association with an algorithm or the like and a computer or the like determine an appropriate target pressure in second fluid chamber C2. The target pressure may be based on multiple variables, by way of example forward vehicle speed, vehicle weight, load within vehicle, comfort mode setting of suspension, radius of turn etc. When it is determined that the actual pressure in second fluid chamber C2 is below the target pressure, then the pump P is operated so as to pump fluid from first gallery G1 into the second gallery G2. As the pressure in gallery G2 rises, hydraulic fluid may flow past check valve V3B causing the hydraulic pressure in gallery 32 and hence in the second fluid chamber C2 to also rise. Hydraulic pressure in hydraulic accumulator A3 will similarly rise.

The hydraulic pressure in hydraulic accumulator A4 will rise, dependent upon the characteristics of valve V4. As the pressure in the second fluid chamber C2 increases, the piston 24 may rise (when viewing FIG. 2) causing hydraulic fluid to be expelled from the first fluid chamber C1. The expelled fluid will flow into gallery G1 dependent upon the flow characteristics of valve V1A, thus replacing some of the fluid lost from gallery G1 to gallery G2 via pump P. Fluid from hydraulic accumulator A1 will pass into gallery G1 and fluid from hydraulic accumulator A2 will pass via valve X1 into gallery G1.

After a period of time a steady equilibrium will be reached wherein the pressure in gallery G2, accumulators A3 and A4, gallery 32 and in the second fluid chamber C2 are all equal. The magnitude of this steady state pressure (the target pressure) will determine the appropriate pump speed bearing in mind the leakage characteristics of the pump. In the interest of system performance, it is desirable to minimize the time taken to reach the target pressure, and to minimize the energy used to charge accumulators A3 and A4. To this end, during the transient phase following a driver induced input, the valve V4 may be controlled to limit flow into accumulator A4. Once the desired target pressure has been achieved in the second fluid chamber C2, the characteristics of the valve V4 may be modified such that it becomes progressively less restrictive (i.e. it progressively allows more flow) and the pressure in accumulator A4 may then rise to be in equilibrium with the target pressure.

As the vehicle continues to negotiate the right-hand bend consider the scenario where there is a disturbance input in the form of the wheel 12 hitting a bump. While the target pressure in the second fluid chamber C2 is tending to extend the actuator 18, the bump in the road will cause the actuator 18 to contract thereby causing hydraulic fluid to flow out of the second fluid chamber C2 and hence into the first fluid chamber C1. Fluid flow into the first fluid chamber C1 is provided primarily by hydraulic fluid from accumulator A1 flowing through valve V1B. However, hydraulic fluid flowing out of the second fluid chamber C2 is damped by valve V3A. Thus, valve V3A acts as a damper valve under these circumstances. Hydraulic fluid passing through valve V3A will primarily cause fluid to flow into accumulator A3. Once the bump has been negotiated the piston 24 will return to its steady state position. The bump will create a high frequency road induced input which is accommodated primarily by accumulator A3 which is close to second fluid chamber C2 when compared with accumulator A4 (as will be discussed further below).

Alternatively, while negotiating the right-hand bend, there is a disturbance input in the form of the wheel 12 hitting a pot hole or the like thereby causing the actuator 18 to extend. This extension causes hydraulic fluid to flow out of the first fluid chamber C1 and hence into the second fluid chamber C2. Hydraulic fluid flow into the second fluid chamber C2 is provided primarily by hydraulic fluid from accumulator A3 passing through valve V3B. Hydraulic fluid flowing out of the first fluid chamber C1 is restricted by valve V1A which acts as a damper valve. Hydraulic fluid passing through valve V1A will primarily cause fluid to flow into accumulator A1. Once the pot hole has been negotiated the piston 24 will return to its steady state position. The pot hole will create a high frequency road induced input which is accommodated primarily by accumulator A1 which is close to first fluid chamber C1 when compared with accumulator A2 (as will be discussed further below).

Example 2

This example is the same as example 1 except the driver creates a driver induced input by turning the steering wheel 11 in an opposite direction (in an anticlockwise direction) which causes the vehicle to turn to the left which in turn causes the vehicle to roll in the opposite direction, in this case to the right. The wheel 12 shown in FIG. 2 is the front left wheel and therefore becomes an inside wheel of the turn and under these circumstances, instead of creating a target pressure for the second fluid chamber C2, rather a target pressure is created for the first fluid chamber C1. Where it is determined the actual pressure in the first fluid chamber C1 is below the target pressure, then the pump is operated in the reverse direction from example 1, so as to pump fluid from the second gallery G2 into the first gallery G1. As the pressure in gallery G1 rises, hydraulic fluid will flow past check valve V1B causing the hydraulic pressure in gallery 30 and hence in the first fluid chamber C1 to also rise. Hydraulic pressure in hydraulic accumulator A1 will similarly rise.

The hydraulic pressure in hydraulic accumulator A2 will rise, dependent upon the characteristics of valve V2. As the pressure in the first fluid chamber C1 increases, the piston 24 may move down (when viewing FIG. 2) causing hydraulic fluid to be expelled from the second fluid chamber C2. The expelled fluid will flow into gallery G2 dependent upon the flow characteristics of valve V3A, thus replacing some of the fluid lost from gallery G2 to gallery G1 via pump P. Fluid from hydraulic accumulator A3 will pass into gallery G2 and fluid from hydraulic accumulator A4 will pass via valve X2 into gallery G2.

After a period of time a steady state equilibrium will be reached wherein the pressure in gallery G1, accumulators A1 and A2, gallery 30 and in the first fluid chamber C1 are all equal. The magnitude of this steady state pressure (the target pressure) will determine the appropriate pump speed, bearing in mind the leakage characteristics of the pump. In the interest of system performance, it is desirable to minimize the time taken to reach the target pressure, and to minimize the energy used to charge accumulators A1 and A2. To this end, during the transient phase following a driver induced input, the valve V2 may be controlled to limit flow into accumulator A2. Once the desired target pressure has been achieved in the first fluid chamber C1, the characteristics of valve V2 may be modified such that it becomes progressively less restrictive (i.e. it progressively allows more flow) and the pressure in accumulator A2 may then rise to be in equilibrium with the target pressure.

When the inside wheel hits a bump, hydraulic fluid flowing out of the second fluid chamber C2 will be damped by valve V3A in a manner similar to that as described above in example 1. Similarly, when the inside wheel hits a pot hole, hydraulic fluid flowing out of hydraulic chamber C1 will be damped by valve VIA in a manner similar to that as described above in example 1.

Example 3

In this case, the vehicle is travelling in a straight line and the weight of the vehicle associated with wheel 12 is substantially entirely carried by spring 20, and hence the actuator is not generating any significant vertical force, i.e. the actuator is not generating an extension force, nor is generating a contraction force. In the event that wheel 12 hits a bump, the wheel moves up relative to the body causing contraction of the actuator 18 resulting in hydraulic fluid being expelled from chamber C2 and passing through valve V3A thereby damping contractive movement of the actuator. Simultaneously hydraulic fluid will flow into fluid chamber C1 via valve V1B primarily from accumulator A1.

As will be appreciated, when the vehicle hits a bump then valve V3A acts as a damper.

As will also be appreciated, when the vehicle travels in a straight line and the wheel hits a pot hole, then the actuator 18 will tend to extend resulting in valve VIA acting as a damper valve. Thus, extension of the actuator 18 is damped by valve VIA and contraction of the actuator 18 is damped by valve V3A.

Gallery G1 includes a flexible hydraulic line in the form of hose H1 having a first end H1A and a second end H1B. The pump P, valve V2, and check valve X1 are all attached to the body 16 and hence form part of the sprung mass of the vehicle. End H1A of hose H1 also forms part of the sprung mass of the vehicle. In contrast, cylinder 22, gallery 30, valve V1, accumulator A1 and end H1B of hose H1 all form part of the unsprung mass of the vehicle. Hose H1 therefore accommodates the relative movement between the sprung mass and unsprung mass of the vehicle.

Similarly, gallery G2 includes a flexible hydraulic line in the form of hose H2 which has a first end H2A and a second end H2B. First end H2A, valve V4, check valve X2, and accumulator A4 all form part of the sprung mass of the vehicle, whereas end H2B, accumulator A3, valve V3 and hydraulic gallery 32 all form part of the unsprung mass of the vehicle.

As can be seen from FIG. 2, part of the first hydraulic circuit 28 (that part to the right of end H1A of hose H1 when viewing FIG. 2) define sprung mass of the vehicle, and another part of the first hydraulic circuit 28 (that part to the left of end H1B of hose H1 when viewing FIG. 2) define unsprung mass of the vehicle. Significantly, the first hydraulic circuit 28 only has a single flexible hydraulic line having a first end defined in a sprung mass and a second end defined in an unsprung mass.

Similarly, the second hydraulic circuit 29 has a single flexible hydraulic line having a first end H2A defining a sprung mass and a second end H2B defining an unsprung mass. As will be appreciated from FIG. 2 there are only two hydraulic lines (H1 and H2) per ground engaging structure (e.g. per wheel 12) needed to accommodate the movement between the sprung mass and unsprung mass of the ground engaging structure of the vehicle.

Accumulator A1 has a smaller capacity than accumulator A2. Accumulator A1 may be mounted on cylinder 22. Valve V1 may be mounted on cylinder 22. The hydraulic pathway between accumulator A2 and chamber C1 includes valve V2, check valve X1, and hydraulic hose H1 whereas the hydraulic connection between accumulator A1 and chamber C1 does not include valve V1, X1 or hose H1. Because of this accumulator A1 is better able to accommodate high frequency flow variations, such as caused by road induced inputs.

Actuator 18 has a full stroke, i.e. the full stroke of actuator 18 is the difference between its fully extended length and its fully contracted length. The difference in volume of chamber C1 between when the actuator 18 is fully extended and fully contracted defines a full stroke volume of the first fluid chamber C1. Similarly, the difference in volume of the second fluid chamber C2 between when the actuator 18 is fully extended and fully contracted defines a full stroke volume of the second fluid chamber C2.

A combined volume of the first A1 and second A2 accumulators may be greater than the full stroke volume of the first fluid chamber C1.

A combined volume of the first A1 and second A2 accumulators may be greater than a combined volume of the full stroke volume of the first fluid chamber C1 and the full stroke volume of the second fluid chamber C2.

A volume of the first accumulator A1 may be less than the full stroke volume of the first fluid chamber C1.

A combined volume of the third A3 and fourth A4 accumulators may be greater than the full stroke volume of the second fluid chamber C2.

A combined volume of the third A3 and fourth A4 accumulators may be greater than a combined volume of the full stroke volume of the first fluid chamber C1 and the full stroke volume of the second fluid chamber C2.

The volume of the third accumulator A3 may be less than the full stroke volume of the second fluid chamber C2.

As will be appreciated, the first fluid chamber C1 can vent fluid to hydraulic accumulators A1 and/or A2. Since hydraulic accumulator A1 is a relatively close both physically and hydraulically to the first fluid chamber C1 this accumulator can accommodate high frequency road induced inputs which tend to require relatively low mounts of hydraulic fluid to accommodate. Conversely the hydraulic accumulator A2, being larger, is better able to accommodate larger volumes of hydraulic fluid associated with larger relative movements of the piston within the cylinder 22 often associated with low frequency driver induced inputs.

As will be appreciated, the second fluid chamber C2 can vent fluid to hydraulic accumulators A3 and/or A4. Since hydraulic accumulator A3 is a relatively close both physically and hydraulically to the second fluid chamber C2 this accumulator can accommodate high frequency road induced inputs which tend to require relatively low mounts of hydraulic fluid to accommodate. Conversely the hydraulic accumulator A4, being larger, is better able to accommodate larger volumes of hydraulic fluid associated with larger relative movements of the piston within the cylinder 22 often associated with low frequency driver induced inputs.

As mentioned above, valve V2 is a variable pressure relief valve and the relief valve setting of valve V2 can be varied to suit the particular circumstances. In particular, the relief valve pressure setting of valve V2 may be dependent upon a target pressure in the first chamber C1. Typically, the relief valve pressure for valve V2 will be set below the target pressure for chamber C1 but at a value sufficiently high that during an initial transient phase a flow from pump P primarily flows into chamber C1 and actuator A1, and only during the latter part of the transient phase, when the pressure in chamber C1 and accumulator A1 has reached the relief valve pressure set on valve V2 does hydraulic fluid from pump P flow through valve V2 into accumulator A2. In this way the target pressure in chamber C1 and accumulator A1 can be reached quickly without having the need to pressurize accumulator A2. By providing a system where the target pressure in chamber C1 and A1 can be approached quickly, then in the event of any high frequency road induced inputs accumulator A1 can compensate for such inputs even if accumulator A2 is at a pressure lower than a target pressure. As such, the system achieves a pressure in chamber C1 at or near the target pressure quickly without the need to fully charge accumulator A2 to the target pressure thereby providing a more efficient system.

As mentioned above, valve V4 is a variable pressure relief valve and the relief valve setting of valve V4 can be varied to suit the particular circumstances. In particular, the relief valve pressure setting of valve V4 may be dependent upon a target pressure in the second chamber C2. Typically, the relief valve pressure for valve V4 will be set below the target pressure for chamber C2 but at a value sufficiently high that during an initial transient phase a flow from pump P primarily flows into chamber C2 and actuator A3, and only during the latter part of the transient phase, when the pressure in chamber C2 and accumulator A3 has reached the relief valve pressure set on valve V4 does hydraulic fluid from pump P flow through valve V4 into accumulator A4. In this way the target pressure in chamber C2 and accumulator A3 can be reached quickly without having the need to pressurize accumulator A4. By providing a system where the target pressure in chamber C2 and A3 can be approached quickly, then in the event of any high frequency road induced inputs accumulator A3 can compensate for such inputs even if accumulator A4 is at a pressure lower than a target pressure. As such, the system achieves a pressure in chamber C1 at or near the target pressure quickly without the need to fully charge accumulator A4 to the target pressure thereby providing a more efficient system.

In further embodiments the ground engaging structure may be a vehicle track and the vehicle may be a track laying vehicle.

As described above, in the various examples, the vehicle is being driven by a driver. In further embodiments, the vehicle may be an autonomous vehicle and therefore may not have a driver.

The invention claimed is:

1. An actuator system for a vehicle suspension system comprising:
    an actuator having a piston and a first fluid chamber separated from a second fluid chamber by the piston;
    a hydraulic pump having a first port connected by a first hydraulic circuit to the first chamber via a first valve, the first valve being a damper valve operable to variably restrict flow of hydraulic fluid out of the first chamber;
    a first hydraulic accumulator connected to the first hydraulic circuit between the first port and the first valve; and
    a second hydraulic accumulator connected to the first port by a second valve, the second valve being a variable pressure relief valve operable to variably restrict flow of hydraulic fluid from the first port to the second hydraulic accumulator.

2. The actuator system of claim 1, wherein the hydraulic pump has a second port connected by a second hydraulic circuit to the second chamber via a third valve, the third valve being a damper valve operable to variably restrict flow of hydraulic fluid out of the second chamber,
    the actuator system further comprising:
    a third hydraulic accumulator connected to the second hydraulic circuit between the second port and the third valve; and
    a fourth hydraulic accumulator connected to the second port by a fourth valve, the fourth valve being a variable pressure relief valve operable to variably restrict flow of hydraulic fluid from the second port to the fourth hydraulic accumulator.

3. The actuator system of claim 1, wherein the actuator has a full stroke defining a full stroke volume of the first fluid chamber and a full stroke volume of the second fluid chamber and a combined volume of the first and second accumulators is greater than the full stroke volume of the first fluid chamber.

4. The actuator system of claim 3, wherein the combined volume of the first and second accumulators is greater than a combined volume of the full stroke volume of the first fluid chamber and the full stroke volume of the second fluid chamber.

5. The actuator system of claim 3, wherein a volume of the first accumulator is less than the full stroke volume of the first fluid chamber.

6. The actuator system of claim 2, wherein the actuator has a full stroke defining a full stroke volume of the first fluid chamber and a full stroke volume of the second fluid chamber and a combined volume of the third and fourth accumulators is greater than the full stroke volume of the second fluid chamber.

7. The actuator system of claim 6, wherein the combined volume of the third and fourth accumulators is greater than a combined volume of the full stroke volume of the first fluid chamber and the full stroke volume of the second fluid chamber.

8. The actuator system of claim 6, wherein the volume of the third accumulator is less than the full stroke volume of the second fluid chamber.

9. The actuator system of claim 1, wherein the pump is a reversible pump.

* * * * *